United States Patent [19]

Decker, Jr.

[11] Patent Number: 5,862,114
[45] Date of Patent: Jan. 19, 1999

[54] TRACK DISABLING SYSTEM AND METHOD FOR AUDIO COMPACT DISKS

[76] Inventor: Nelson Joseph Decker, Jr., 718 Carol Marie, Baton Rouge, La. 70806-5615

[21] Appl. No.: 879,129

[22] Filed: Jun. 19, 1997

[51] Int. Cl.$^6$ ..................................................... G11B 7/00
[52] U.S. Cl. ............................................................... 369/52
[58] Field of Search ................................. 369/52, 53, 54, 369/58; 101/3.1, 4, 35

[56] References Cited

U.S. PATENT DOCUMENTS 5,282,187  1/1994  Lee ............................................ 369/52

*Primary Examiner*—Thang V. Tran
*Attorney, Agent, or Firm*—Joseph N. Breaux

[57] ABSTRACT

An audio track disabling system and method wherein the track disabling system includes a disk holding assembly, for holding an audio compact disk, and a marking mechanism that includes a marking tip and a marking tip positioning mechanism; and the track disabling method includes the steps of 1) providing a track disabling system that includes a disk holding assembly, for holding an audio compact disk, and a marking mechanism that includes a marking tip and a marking tip positioning mechanism; 2) positioning an audio compact disk onto the disk holding assembly; 3) manipulating the positioning mechanism in a manner to position the marking tip onto a surface of the audio compact disk that is above the audio track to be disabled; and 4) manipulating the marking tip in a manner to create a disabling mark that provides a light blocking obstruction on the surface of the audio compact disk above the audio track to be disabled.

8 Claims, 3 Drawing Sheets

FIG. 1
FIG. 2
FIG. 3
FIG. 4
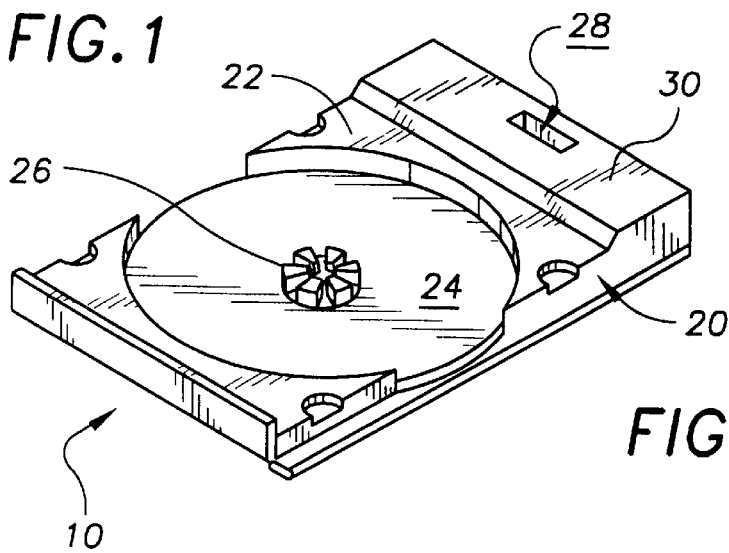
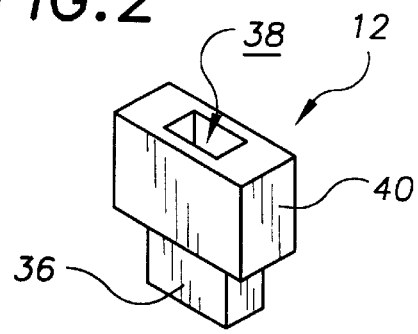
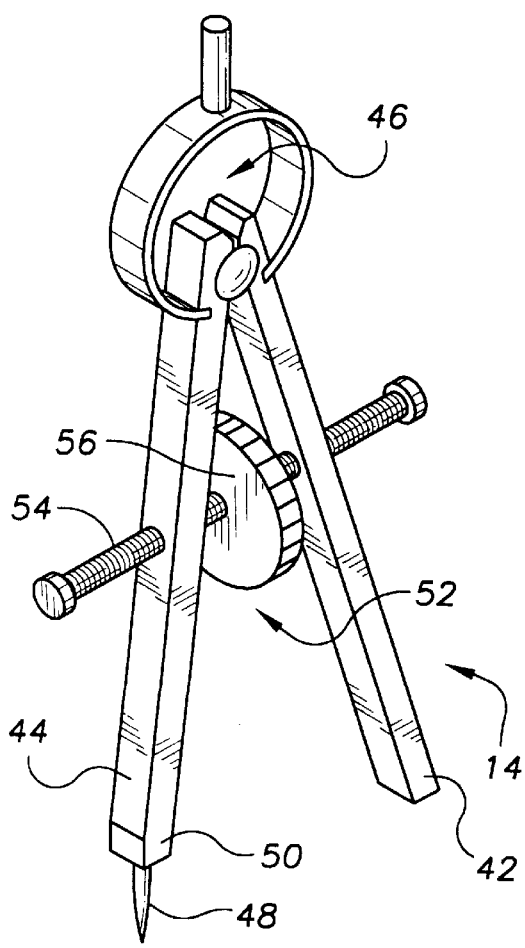
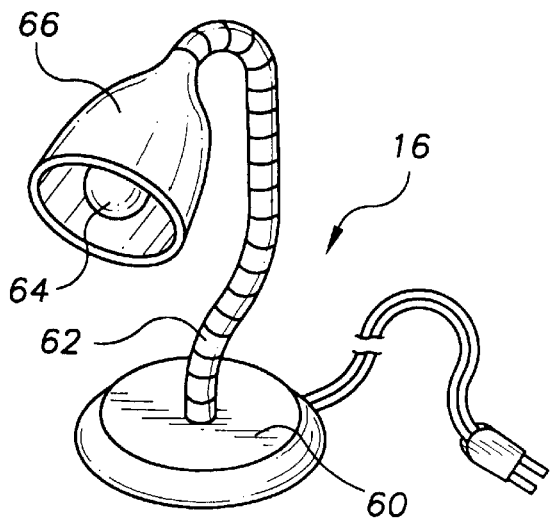

TRACK DISABLING SYSTEM AND METHOD FOR AUDIO COMPACT DISKS

TECHNICAL FIELD

The present invention relates to erasing devices for audio storage media and more particularly to a track disabling system and a method for disabling audio tracks on an audio compact disk wherein the track disabling system includes a disk holding assembly, for holding an audio compact disk, and a marking mechanism that includes a marking tip and a marking tip positioning mechanism, the positioning mechanism being provided to allow a user to precisely position the marking tip onto a surface of an audio compact disk held by the disk holding assembly, the marking tip including a marking means for creating a disabling mare providing a light blocking obstruction on the surface of the audio compact disk above the audio track to be disabled; and wherein the method for disabling audio tracks on an audio compact disk includes the steps of 1) providing a track disabling system that includes a disk holding assembly, for holding an audio compact disk, and a marking mechanism that includes a marking tip and a marking tip positioning mechanism, the positioning mechanism being provided to allow a user to precisely position the marking tip onto a surface of an audio compact disk held by the disk holding assembly, the marking tip including a marking means for creating a disabling mark providing a light blocking obstruction on the surface of the audio compact disk above the audio track to be disabled; 2) positioning an audio compact disk onto the disk holding assembly; 3) manipulating the positioning mechanism in a manner to position the marking tip onto a surface of the audio compact disk that is above the audio track to be disabled; and 4) manipulating the marking tip in a manner to create a disabling mark that provides a light blocking obstruction on the surface of the audio compact disk above the audio track to be disabled.

BACKGROUND OF THE INVENTION

It is often desirable to remove or otherwise disable one or more audio tracks from an audio compact disk. It would be a benefit, therefore, to have a track disabling system for disabling particular tracks on an audio compact disk and a method or disabling a particular audio track on an audio compact disk. Because identifying the correct track on the audio compact disk can be difficult, it would be a benefit if the track disabling system for disabling particular tracks on an audio compact disk included a magnification mechanism for assisting an individual to identify the correct track area. In addition, to further assist the individual in identifying the correct track area, it would be a further benefit if the track disabling system for disabling particular tracks on an audio compact disk also included a user positionable light source to create greater contrast between the inter-track demarcation rings and the track audio data storage areas on the audio compact disk.

SUMMARY OF THE INVENTION

It is thus an object of the invention to provide a track disabling system for audio compact disks.

It is a still further object of the invention to provide a track disabling system for audio compact disks that includes a disk holding assembly, for holding an audio compact disk, and a marking mechanism that includes a marking tip and a marking tip positioning mechanism, the positioning mechanism being provided to a low a user to precisely position the marking tip onto a surface of an audio compact disk held by the disk holding assembly, the marking tip including a marking means for creating a disabling mark providing a light blocking obstruction on the surface of the audio compact disk above the audio track to be disabled.

It is a still further object of the invention to provide a track disabling system for audio compact disks that accomplishes some or all of the above objects in combination.

It is a further object of the invention to provide a method for disabling desired audio tracks on an audio compact disk.

It is a still further object of the invention to provide a method for disabling desired audio tracks on an audio compact disk that includes the steps of 1) providing a track disabling system that includes a disk holding assembly, for holding an audio compact disk, and a marking mechanism that includes a marking tip and a marking tip positioning mechanism, the positioning mechanism being provided to allow a user to precisely position the marking tip onto a surface of an audio compact disk held by the disk holding assembly, the marking tip including a marking means for creating a disabling mark providing a light blocking obstruction on the surface of the audio compact disk above the audio track to be disabled; 2) positioning an audio compact disk onto the disk holding assembly; 3) manipulating the positioning mechanism in a manner to position the marking tip onto a surface of the audio compact disk that is above the audio track to be disabled; and 4) manipulating the marking tip in a manner to create a disabling mark that provides a light blocking obstruction on the surface of the audio compact disk above the audio track to be disabled.

It is a still further object of the invention to provide a method for disabling desired audio tracks on an audio compact disk that accomplishes some or all of the above objects in combination.

Accordingly, a track disabling system for audio compact disks is provided. The audio track disabling system includes a disk holding assembly, for holding an audio compact disk, and a marking mechanism that includes a marking tip and a marking tip positioning mechanism, the positioning mechanism being provided to allow a user to precisely position the marking tip onto a surface of an audio compact disk held by the disk holding assembly, the marking tip including a marking means for creating a disabling mark providing a light blocking obstruction on the surface of the audio compact disk above at least a portion of the audio track to be disabled. The term "light blocking obstruction" is used herein to mean sufficiently deleterious to the transmission of light to prevent the laser within the compact disk player for reading digital audio data through the obstruction.

Although the marking tip car be a simple scribe point for creating a disabling mark that provides light obstructing scribe marks on the surface of the compact disk, the marking tip is preferably of a type useable to create a disabling mark that provides a light blocking obstruction such as a light degrading or opaque coating on the compact disk surface. The light degrading or opaque coating on the compact disk surface is preferably removable to allow a user to enable access to the track if desired. The marking tip preferably dispenses a pigmented light blocking liquid, such as an ink, that cures to form a light obstructing coating.

In a preferred embodiment, the track disabling system for compact disks further includes a magnification mechanism that is used to help identify the inter-track demarcation rings that define and are positioned between the audio tracks of the compact disk. In another preferred embodiment, the track disabling system for compact disks further includes a postionable light source and a magnification mechanism. The positionable light source is used to assist in identifying the inter-track demarcation rings by increasing the contrast between the inter-track demarcation rings and one track audio data storage areas.

In a second aspect of the invention a method for disabling audio tracks on an audio compact disk: is provided. The method for disabling audio tracks on an audio compact disk includes the steps of 1) providing a track disabling system that includes a disk holding assembly, for holding an audio compact disk, and a marking mechanism that includes a marking tip and a marking tip positioning mechanism, the positioning mechanism being provided to allow a user to precisely position the marking tip onto a surface of an audio compact disk held by the disk holding assembly, the marking tip including a marking means for creating a disabling mark providing a light blocking obstruction disabling mark on the surface of the audio compact disk above the audio track to be disabled; 2) positioning an audio compact disk onto the disk holding assembly; 3) manipulating the positioning mechanism in a manner to position the marking tip onto a surface of the audio compact disk that is above the audio track to be disabled; and 4) manipulating the marking tip in a manner to create a disabling mark that provides a light blocking obstruction on the surface of the audio compact disk above the audio track to be disabled.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein:

FIG. 1 is a perspective view of an exemplary embodiment of the disk holding assembly of the track disabling system for audio compact disks of the present invention showing the disk holding tray, the disk depression formed into the disk holding tray, the central disk spindle extending upwardly from the center of the disk depression, and the rectangular shaped marking mechanism mounting cavity formed into an edge portion of the disk holding tray.

FIG. 2 is a perspective view of an exemplary embodiment of an optional mounting block of the track disabling system for audio compact disks of the present invention showing the mounting cavity insertion pin and the marking mechanism receiving channel.

FIG. 3 is a perspective vies of an exemplary embodiment of the marking mechanism of the track disabling system for audio compact disks of the present invention showing the fixed rod, the traveling rod, the ink impregnated, porous marking tip, extending from the traveling end of the traveling rod, and the rod spacing mechanism including the rod positioning screw and the centrally located thumb wheel.

FIG. 4 is a perspective view of an exemplary embodiment of the optional user positionable light source of the track disabling system for audio compact disks of the present invention showing the support base, the goose neck support, the light bulb and the reflector.

DESCRIPTION OF THE EXEMPLARY EMBODIMENT

Figure 5:
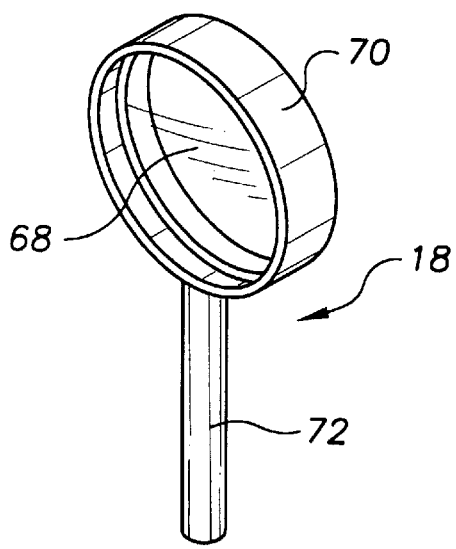
FIG. 5 is a perspective view of an exemplary embodiment of the magnifying mechanism of track disabling system for audio compact disks of the present invention showing the magnifying lens, the lens holder ring, and the handle portion.
Figure 6:
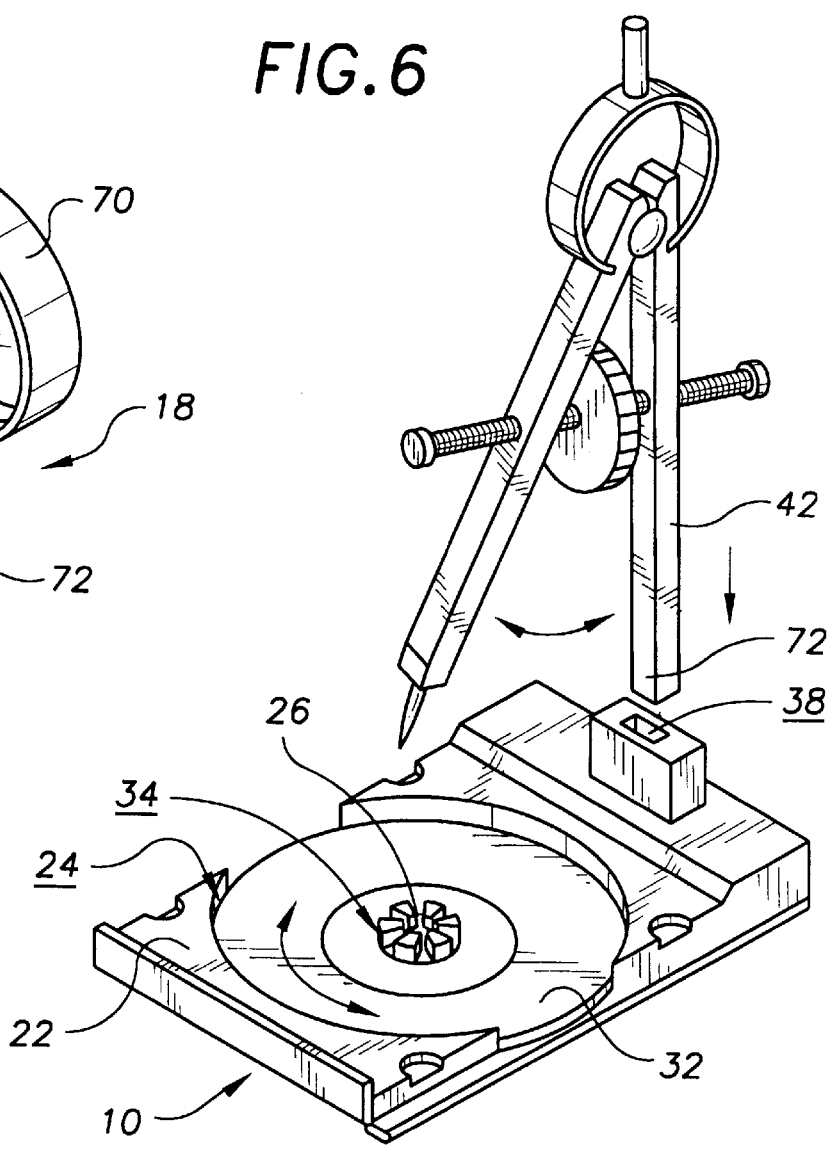
FIG. 6 is a perspective view showing the exemplary disk holding assembly of FIG. 1 with a representative audio compact disk positioned within the disk depression and rotatably mounted onto the central disk spindle; the insertion pin of the mounting block inserted into the marking mechanism mounting cavity, and the fixed rod of the marking mechanism positioned above the marking mechanism receiving channel of the mounting block.

FIGS. 1–5 each show an exemplary embodiment of an element of an exemplary embodiment of the audio track disabling system for audio compact disks of the present invention. In this embodiment, the audio track disabling system includes a disk holding assembly, generally designated 10 (FIG. 1); an optional mounting block, generally designated 12 (FIG. 2); a marking mechanism, generally designated 14 (FIG. 3); a user positionable light source, generally designated 16 (FIG. 4): and a magnifying mechanism, generally designated 18 (FIG. 5).

Figure 7:
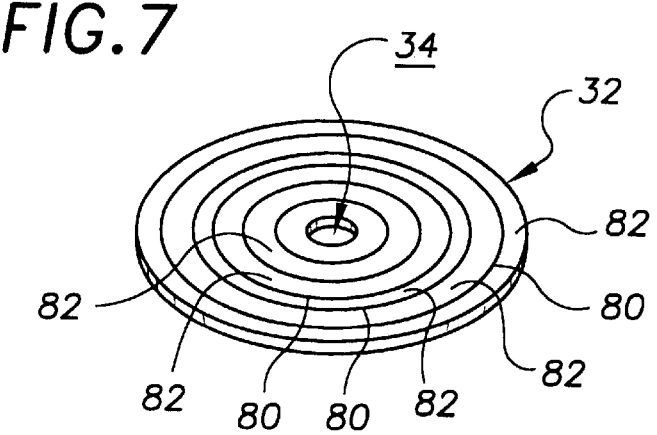
FIG. 7 is a perspective view of a representative audio compact disk showing the inter-track demarcation rings between the audio tracks of the compact disk as they appear under illumination from the positionable light source and magnification by the magnification lens of the magnification mechanism.

With reference to FIG. 1, in this embodiment disk holding assembly 10 is a modified base portion, generally designated 20, of a conventional jewel box of the type within which compact disks are typically sold. Base portion 20 includes a disk holding tray 22, a circular disk depression 24 forced into disk holding tray 22, a centrally positioned disk spindle 26 that extends upwardly from the center of disk depression 24, and a rectangular shaped marking mechanism mounting cavity 28 formed into an edge portion 30 of disk holding tray 22. Although a rectangular shape is used for mounting cavity 28 in this embodiment, any keyed cavity shape can be substituted for the rectangular shape if desired. Circular disk depression 24 is sized to receive a standard size audio compact disk 32 (FIG. 7). Disk spindle 26 is sized fit within the central disk opening 34 (FIG. 7) of a compact disk 32 (FIG. 7) while allowing restricted rotation of compact disk 32 (FIG. 7) about the center of disk spindle 26.

With reference now to FIG. 2, in this embodiment, mounting block 12 is of molded plastic construction and includes a rectangular shaped mounting cavity insertion pin 36 and a rectangular shaped marking mechanism receiving channel 38 formed into an upper body portion 40. Mounting cavity insertion pin 36 is sized to fit within marking mechanism mounting cavity 28. Marking mechanism receiving channel 38 has he same dimensions as marking mechanism mounting cavity 28. Mounting block 12 is optional and is provided only as a height extension unit for marking mechanism 14 if desired.

With reference to FIG. 3, in this embodiment, marking mechanism 14 is a modified compass unit that includes a fixed rod 42 having a rectangular shaped cross-section; a traveling rod 44 pivotally connected to fixed rod 42 by a spring loaded pivoting mechanism, generally designated 46; an ink impregnated, porous marking tip 48 extending from a traveling end 50 of traveling rod 44; and a rod spacing mechanism, generally designated 52, that includes a rod positioning screw 54 and a centrally located thumb wheel 56.

With reference to FIG. 4, in this embodiment, user positionable light source 16 is a conventional goose neck type lamp having a support base 60, a bendable goose neck support 62, a light bulb 64 and a reflector cover 66. Although a goose neck type lamp is used in this embodiment of the audio track disabling system for audio compact disks, any light source positionable by a user can be used to practice the invention. With reference to FIG. 5, in this embodiment, magnifying mechanism 18 is conventional magnifying glass including a magnifying lens 68, a lens holder ring 70, and a handle portion 72.

Use of the exemplary track disabling system for audio compact disks of the present invention is now described in connection with the description of an exemplary method for disabling an audio track of an audio compact disk and with general reference to FIGS. 6–10. In this method disk holding assembly 10 is positioned onto a flat surface such as a table top; and the compact disk 32 to have the track disabled is secured to disk holding assembly 10 by positioning compact disk 32 with the fully silvered side facing upward, positioning the central disk opening 34 of the audio compact disk 32 over disk spindle 26 and positioning the audio compact disk 32 into circular disk depression 24 of disk holding tray 22. With audio compact disk secured to disk holding assembly 10, the rectangular shaped mounting cavity insertion pin 36 (FIG. 2) of mounting block 12 is inserted into marking mechanism mounting cavity 28 (FIG. 1) and the end 72 of fixed rod 42 is inserted partially into marking mechanism receiving channel 38.

With reference to FIG. 7, user positionable light source 16 (FIG. 4) and magnifying mechanism 18 (FIG. 5) are then used as previously describe to locate the inter-track demarcation rings 80 that are located between the audio tracks 82 of compact disk 32.

Figure 8:
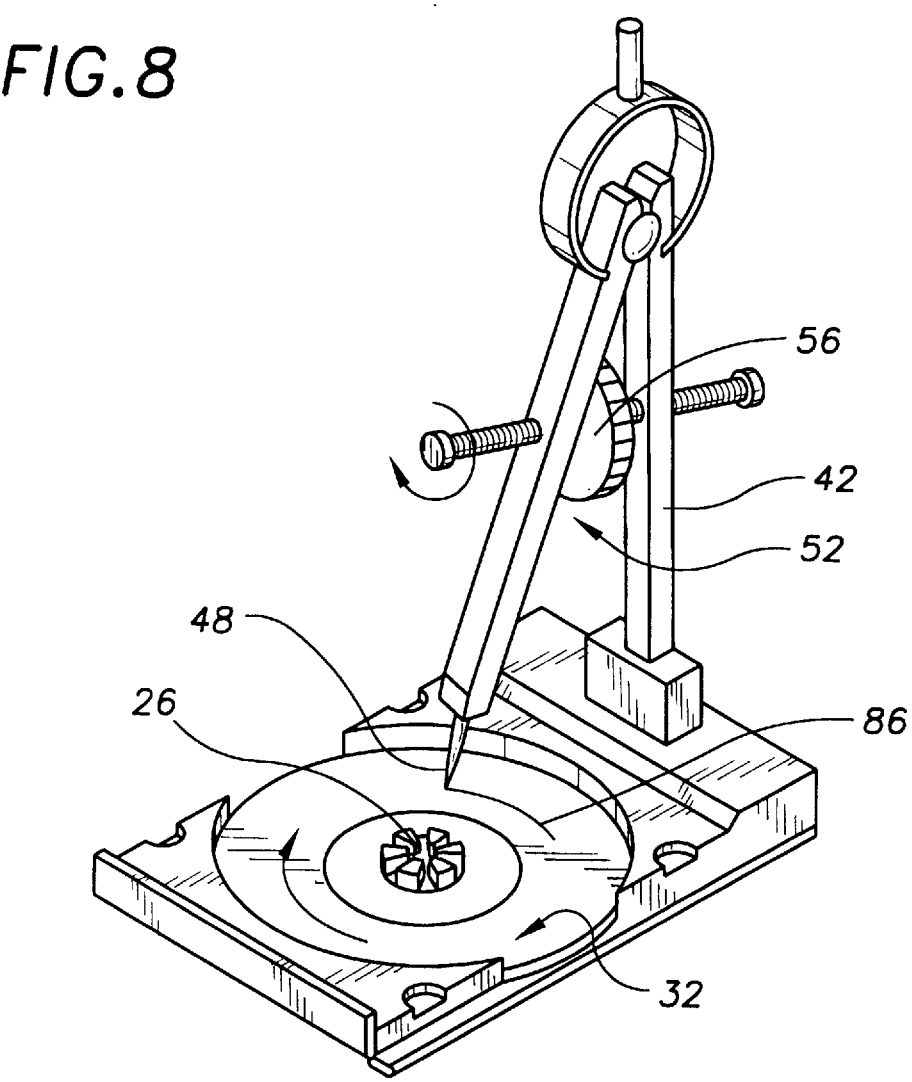
FIG. 8 is a perspective view showing the exemplary disk holding assembly of FIG. 1 with the representative audio compact disk of FIG. 7 positioned within the disk depression and rotatably mounted onto the central disk spindle; the insertion pin of the mounting block inserted into the marking mechanism mounting cavity, and the fixed rod positioned into the marking mechanism receiving channel of the mounting block, the marking tip of the marking mechanism positioned onto the surface of the representative audio compact disk above the rack to be disabled, and a disabling mark partially formed over a section of the audio track to be disabled.
Figure 9:
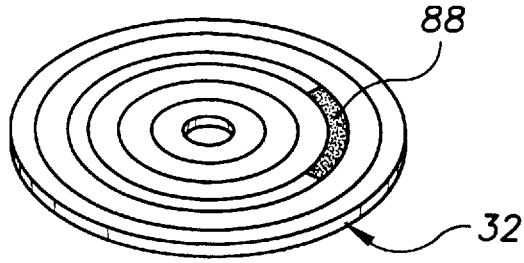
FIG. 9 is a perspective view of the representative audio compact disk of FIG. 7 with a full width disabling mark formed over a ninety degree (90°) section of the second track of the audio disk.
Figure 10:
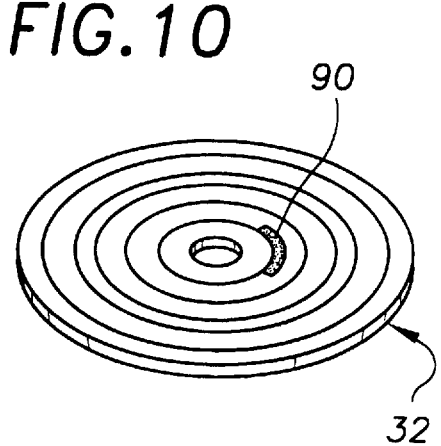
FIG. 10 is a perspective view of the representative audio compact disk of FIG. 7 with a half width disabling mark formed over a ninety degree (90°) section of the first track of the audio disk.

Referring to FIG. 8, once the user has identified the audio track 82 to be disabled, rod spacing mechanism 52 is used to positioning marking tip 48 over the desired sector of compact disk 32. This positioning is accomplished by rotating thumb wheel 56 in the required direction. Fixed rod 42 is then fully inserted into marking mechanism receiving channel 38 (FIG. 6) and marking tip 48 contacts the plastic surface covering the fully silvered side of compact disk 32 over the area containing the audio track to be disabled. Compact disk 32 is then rotated about spindle 26 to create a first sector marking 86. As each sector marking 86 is completed, thumb wheel 56 is rotated slightly to reposition marking tip 48, compact disk 32 is the rotated ninety degrees in the opposite direction. This marking procedure is repeated until, with reference to FIG. 9, a full width disabling mark 88 is formed over a ninety degree (90°) section of track to be disabled or, with reference to FIG. 10, a half-width disabling mark 90 is formed over a ninety degree (90°) section of the track to be disabled. Although the disabling marks 88,90 in this exemplary embodiment cover ninety degree sectors of compact disk 32, a disabling mark 88,90 need only be one-quarter inch in length in order to disable the audio track from play on most compact disk players. In use, the disabling marks 88,90 causes a fault/misread condition to occur in the compact disk player. Most compact disk players will automatically skip to the next track after receiving this fault/misread condition more than once.

It can be seen from the preceding description that an audio track disabling system for audio compact disks has been provided that includes a disk holding assembly, for holding an audio compact disk, and a marking mechanism that includes a marking tip and a marking tip positioning mechanism; that includes a marking tip that dispenses a pigmented light blocking ink that cures to form a light obstructing coating; that includes a magnification mechanism that is used to help identify the inter-track demarcation rings that define and are positioned between the audio tracks of the compact disk; and that includes a positionable light source and a magnification mechanism; and a method for disabling audio tracks on an audio compact disk has been provided that includes the steps of 1) providing a track disabling system that includes a disk holding assembly, for holding an audio compact disk, and a marking mechanism that includes a marking tip and a marking tip positioning mechanism, the positioning mechanism being provided to allow a user to precisely position the marking tip onto a surface of an audio compact disk held by the disk holding assembly, the marking tip including a marking means for creating a disabling mark providing a light blocking obstruction disabling mark on the surface of the audio compact disk above the audio track to be disabled; 2) positioning an audio compact disk onto the disk holding assembly; 3) manipulating the positioning mechanism in a manner to position the marking tip onto a surface of the audio compact disk that is above the audio track to be disabled; and 4) manipulating the marking tip in a manner to create a disabling mark that provides a light blocking obstruction on the surface of the audio compact disk above the audio track to be disabled.

It is noted that the embodiment of the track disabling system for audio compact disks described wherein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A track disabling system for audio compact disks comprising:

a disk holding assembly, for holding an audio compact disk; and a marking mechanism that includes a marking tip and a marking tip positioning mechanism; said positioning means is being provided to allow a user to precisely position said marking tip onto a surface of said audio compact disk held by said disk holding assembly, said marking tip including a marking means for creating a disabling mark providing a Light blocking obstruct on said surface of said audio compact disk above at least a portion of an audio track to be disabled on said audio compact disk.

2. The track disabling system for audio compact disks of claim 1, wherein:

said marking tip is impregnated with a supply of pigmented ink, and said marking tip is sufficiently porous to dispense said pigmented ink onto said surface of said audio compact disk in a volume sufficient to create a light obstructing coating that forms said disabling mark.

3. The track disabling system for audio compact disks of claim 2 further include:

a magnification mechanism for magnifying said surface of said audio compact disk to assist said user in identifying inter-track demarcation rings on said audio compact disk that define audio tracks and that are positioned adjacent to said audio tracks of said audio compact disk.

4. The track disabling system for audio compact disks of claim 2 further including:

a positionable light source for use in identifying inter-track demarcation rings on said audio compact disk by providing a light onto said surface of said audio compact disk to increase a contrast between said inter-track demarcation rings and track audio data storage areas.

5. The track disabling system for audio compact disks of claim 1 further including:

a magnification mechanism for magnifying said surface of said audio compact disk to assist said user in identifying inter-track demarcation rings on said audio compact disk that define audio tracks and that are positioned adjacent to said audio tracks of said audio compact disk.

6. The track disabling system for audio compact disks of claim 5 further including:

a positionable light source for use in identifying said inter-track demarcation rings on said audio compact disk by providing a light onto said surface of said audio compact disk to increase a contrast between said inter-track demarcation rings and track audio data storage areas.

7. The track disabling system for audio compact disks of claim 1 further including:

a positionable light source for use in identifying inter-track demarcation rings on said audio compact disk by providing a light onto said surface of said audio compact disk to increase a contrast between said inter-track demarcation rings and track audio data storage areas.

8. A method of disabling an audio track on an audio compact disk that includes the steps of:

A) providing a track disabling system that includes a disk holding assembly, for holding an audio compact disk, and a marking mechanism that includes a marking tip and a marking tip positioning mechanism, said positioning mechanism being provided to allow a user to precisely position said marking tip onto a surface of said audio compact disk held by said disk marking assembly, said marking tip including a marking means for creating a disabling mark providing a light blocking obstruction disabling mark on said surface of said audio compact disk above an audio track to be disabled on said audio compact disk;

B) positioning said audio compact disk onto said disk holding assembly;

C) manipulating said positioning mechanism in a manner to position said marking tip onto said surface of said audio compact disk that is above said audio track to be disabled; and D) manipulating said marking tip in a manner to create said disabling mark that provides a light blocking obstruction on said surface of said audio compact disk above said audio track to be disabled.

* * * * *